Jan. 18, 1949.  E. A. NORDBERG  2,459,536
METHOD AND APPARATUS FOR WINDING COILED BODIES
Filed July 21, 1945
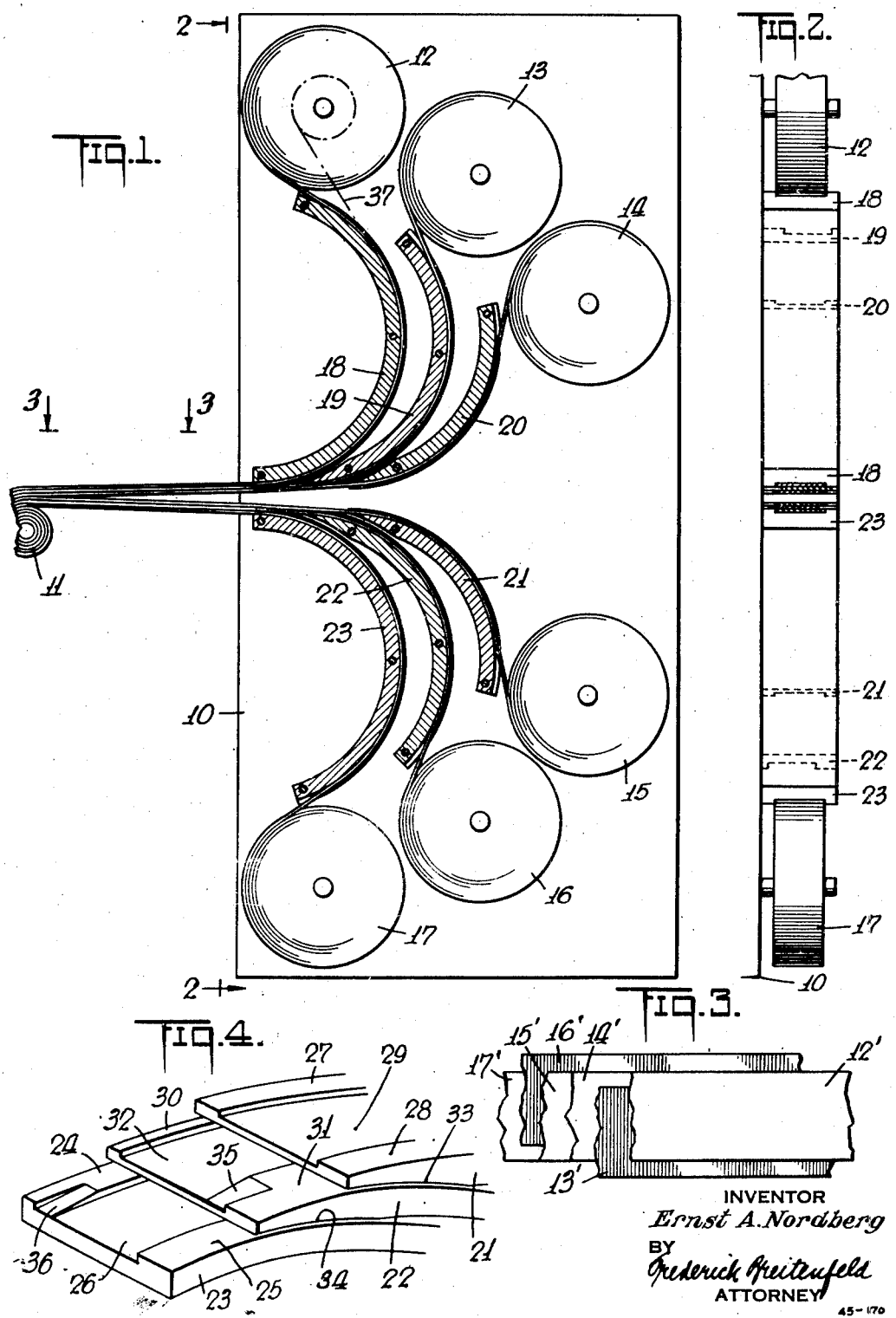
INVENTOR
Ernst A. Nordberg
BY
Frederick Breitenfeld
ATTORNEY Patented Jan. 18, 1949

2,459,536

UNITED STATES PATENT OFFICE 2,459,536

METHOD AND APPARATUS FOR WINDING COILED BODIES

Ernst A. Nordberg, Southport, Conn.

Application July 21, 1945, Serial No. 606,452

9 Claims. (Cl. 242—76)

My present invention relates generally to the art of winding, and has particular reference to the winding of an elongated strip or strips upon a rotating arbor.

The invention is primarily directed to the formation of a coiled body composed of a plurality of interwound strips certain of which are conductive material, such as metal foil, and others of which are dielectric material, such as paper. When such strips are threaded into engagement with a winding arbor in predetermined superposed relationship, a wound body is produced which may be used in the manufacture of an electrical capacitor, certain foil strips defining mutually insulated condenser plates. I have chosen to describe the characterizing features of my invention as it relates to the formation of a coiled condenser body of this general type, although it will be understood that certain phases of the invention are not necessarily restricted to this particular objective.

In a winding apparatus for forming coiled condenser bodies, it is customary practice to mount the several strips in the form of supply reels upon superposed axes parallel to the axis of the winding arbor, and to allow the rotation of the arbor to draw the strips in converging relationship toward the winding station. It is important that the strips be arranged in predetermined alignment, with their edges accurately parallel to the direction of travel; and in certain cases the edges of the foil strips must be in predetermined laterally-offset relationships to the edges of the other strips. A commonly-experienced difficulty arises from the fact that the strips do not remain in the alignment desired, notwithstanding the exercise of care in initially mounting the supply reels in proper relationship. Deviations are due, in part, to the fact that the strips have a tendency to flutter, and are also due, in large measure, to irregularities in the stresses which exist in the strips themselves and which manifest themselves only as the strips are unwound from the supply reel. The problem is particularly serious in the case of strips which are extremely thin, and ordinary guiding expedients have proven ineffective to obviate this difficulty.

It is a general object of the present invention to provide an improved method and apparatus for accomplishing this type of winding, whereby the desired accuracy of alignment is reliably maintained at all times, regardless of in inherent stresses in the strips. The invention is particularly useful when the strips are of unusually thin and delicate character, but its beneficial results are equally manifest with strips of all kinds, regardless of their gauge.

A feature of my invention resides in the interposition, between each supply reel and the arbor, of a strip guide which is curved, the curvature conforming to an arc which is intersected by a straight line between the axes of the supply reel and arbor. As a result, the strip is constrained to travel along a path in which the pull of the winding arbor constantly presses the strip against the guide. This serves not only to maintain the strip in guiding contact with a means for restraining lateral shifting, but also to subject the strip to a continuous tension which helps to maintain the desired accuracy of alignment.

Another feature of the invention lies in so arranging the curvature of the guide that it is reverse with respect to the curvature of the strip on the supply reel. The resultant path of travel of the strip, coupled with the continuous tension to which it is subjected, helps to relieve or counteract any inherent stresses that may exist; and other advantages are achieved and will be pointed out more fully hereinafter.

One way of achieving the objects and advantages of my invention is exemplified in the accompanying drawings, in which:

Figure 1 is an elevational view of a winding apparatus constructed in accordance with the invention;

Figure 2 is an end view along the line 2—2 of Figure 1;

Figure 3 is a detail view in the direction of the arrows 3—3 of Figure 1; and

Figure 4 is an enlarged fragmentary perspective view of the outlet ends of the three lower strip guides shown in Figures 1 and 2.

The apparatus I have chosen to illustrate is one in which four strips of paper or the like are interwound in predetermined fashion with two strips of metal foil to form a coiled condenser body. On a suitable backing 10, pins or shafts are mounted in parallel relationship to a winding arbor 11, adapted to support supply reels 12, 13, 14, 15, 16 and 17. The reels 12, 14, 15 and 17 are the dielectric strips, and the reels 13 and 16 are the foil strips. In the winding of a so-called "non-inductive" body, these strips are brought into the superposed relationships shown most clearly in Figure 3. For the sake of convenience, the same reference numerals, with primes appended, have been applied to the strips of Figure 3 as to the six supply reels from which these strips are drawn. It will be observed that the paper or dielectric strips 12', 14', 15' and 17' are of such a width and in such superposed relation that their lateral edges are in alignment with one another; whereas the foil strip 13' is laterally offset in one direction while the foil strip 16' is laterally offset in the opposite direction.

To maintain this desired alignment and arrangement of the strips, I provide a series of curved strip guides 18, 19, 20, 21, 22 and 23. Each is a curved element of rigid and smooth material, such as metal or the like, and has a shape and size which enables it to be properly arranged with respect to the other guides so that the desired objective is achieved.

Each of the guides has on its convex side a curved or arcuate surface along which the corresponding strip is guided during its travel from the supply reel to the winding arbor. To restrain the lateral shifting of the strip, the guiding surface is provided with at least one, preferably two, upstanding flanges or shoulders so as to define a sort of channel within which the corresponding strip is accommodated, the edges of the strip rubbing in guiding relationship against the shoulders or flanges.

In the embodiment illustrated, the guides 18, 19 and 20 form one group, the guides 21, 22, 23 form another group. This arrangement is not essential, but is convenient where there are six supply reels, as shown. In Figure 4, I have shown the outlet ends of the guides 21, 22 and 23, and a detailed description of the parts shown in Figure 4 will serve fully to explain the structural characteristics of the guides.

I have shown the guide 23 provided with a pair of lateral upstanding shoulders or flanges 24 and 25. The paper strip 17' (not shown in Figure 4) is guided along the resultant channel 26, the edges of the strip riding against the opposite guiding shoulders.

The guide 21 is similarly constructed, having lateral shoulders 27 and 28, the strip 15' being guided along the channel 29 which is thus provided. The channels 26 and 29 are in alignment, as will be understood by observing the alignment of the strips 15' and 17' as shown in Figure 3.

The guide 22 is provided with upstanding lateral shoulders 30 and 31, but in this case the shoulder 31 is considerably wider than the shoulders 25 and 28, while the shoulder 30 is somewhat narrower than the shoulders 24 and 27. This defines a channel or curved floor 32 along which the foil strip 16' is guided and maintained in the laterally-offset relationship shown most clearly in Figure 3.

The guides are so arranged that the strips emanating therefrom in tangential directions are headed straight for the winding arbor 11. The latter is positioned in reasonably close proximity to these outlet ends, so that all the strips are in proper superposed relationship as they approach the arbor. To facilitate this result, it may be desirable to shape the outlet ends as shown in Figure 4, it being observed that the guide 21 has the under-surface of its outlet end tapered as at 33 to fit closely to the upper surface of the adjacent guide 22. The latter has the under-surface of its outlet end similarly tapered, as at 34, for a similar purpose.

So that the flange 31 of the guide 22 will not interfere with the smooth travel of the paper strip 15' emanating from the guide 21, the end portion of this flange or shoulder may be beveled down as shown at 35; and so that the flange or shoulder 24 will not interfere with the smooth passage of the foil strip 16' emanating from the guide 22, the forward end of the flange 24 may be tapered as shown at 36.

The inlet ends of the respective guides are so positioned with respect to the supply reels that the strips will always encounter the guides in a tangential direction. This is clearly shown in Figure 1. Attention is drawn to the fact that the curvature of each of the guides is reverse with respect to the curvature of the corresponding strip on its supply reel. For example, it will be observed that the supply reel 12 rotates in a counter-clockwise direction (as viewed in Figure 1) when the strip is withdrawn therefrom. As the strip encounters the guide 18, it is caused to travel along an arcuate path which may be said to be clockwise in direction. This reversal achieves the important advantage of relieving or counteracting any irregular stresses which may be inherent in the strip in question. Thus, in the orginal winding of the supply reel 12, the paper may have been subjected to irregular pulls or stresses. When this strip is withdrawn in an apparatus of the present kind, these stresses are counteracted or neutralized so that when the strip approaches the winding arbor 11, it has little, if any, tendency to twist, to shift laterally, or otherwise impair its accurate alignment with respect to the other strips entering into the winding procedure.

The reversed curvature hereinbefore mentioned has a further important advantage, indicated by the dot-and-dash line 37 (Figure 1). As the diameter of the supply reel 12 decreases, the continuing rotation of the winding arbor causes the supply reel to rotate faster and faster, and this subjects the strip 12' to a gradually increasing tension. It will be observed, however, that the smaller the diameter of the supply reel 12, the less will be the length of strip in contact with the guide 18. Accordingly, whatever resistance the guide 18 may impose, this resistance gradually diminishes as the diameter of the supply reel diminishes, and this compensates for the increasing tension in the strip and thus minimizes the likelihood of breakage.

This advantage, described in detail in connection with the supply reel 12, is obviously applicable to each of the other supply reels.

Of primary importance is the fact that each curved strip guide conforms to an arc which is intersected by a straight line extending between the axes of the corresponding supply reel and the winding arbor. For example, if a straight line were drawn between the axis of the winding arbor 11 and the axis of the supply reel 14, it is clear that this line would intersect the curved arc along which the guide 20 lies. This arrangement of parts imposes a continuous tension upon the strip which is travelling from the supply reel to the arbor. It is this continuous tension, coupled with the other features hereinbefore mentioned, which assures a constant maintenance of the desired alignments of the several strips in predetermined relationships to one another.

It will be understood that the relationships of foil and paper need not necessarily be the same as those which are shown in the accompanying drawings; that there may be a lesser or greater number of curved guides and a corresponding lesser or greater number of supply reels; and that the strips need not necessarily be caused to lie in the specific offset relationship shown in Figure 3. Basically some of the advantages of the invention are applicable, in a broad sense, to the unwinding of any strip from a supply reel onto a winding mandrel, where the strip is pulled by the rotation of the arbor, and where an accurately-maintained alignment of the strip is of importance.

In general, it will be understood that the details herein described and illustrated, to describe the general nature of the invention, may be modified in a number of respects by those skilled in the art without departing from the spirit and scope of the invention as expressed in the appended claims.

Having thus described my invention and illustrated its use, what I claim as new and desire to secure by Letters Patent is:

1. In the process of winding a plurality of strips in superposed relationship onto a winding arbor, the steps which consist in mounting the several strips in the form of supply reels upon superposed axes parallel to the arbor axis, arranging the edges of said reels in predetermined lateral relationships to one another, threading the strip ends into engagement with the arbor, rotating the arbor to draw selected strip lengths from said supply reels to said arbor, and guiding each strip during substantially its entire travel from supply reel to arbor along an arcuate path whose curvature is reverse with respect to the curvature of said strip on its supply reel.

2. In an apparatus for winding a coiled body composed of superposed strips, a winding arbor, supply reels from which the several strips are drawn in converging relation toward said arbor, and curved strip guides between the supply reels, respectively, and the arbor, each guide having a strip-engaging surface of appreciable length which defines an arcuate path along which the strip is guided during substantially its entire travel from the corresponding supply reel to the arbor, the curvature of each guide conforming to an arc which is intersected by a straight line extending between the axis of the arbor and the axis of the corresponding supply reel, whereby the pulling action of the arbor presses the traveling strip against the strip-engaging surface.

3. In an apparatus of the character described, the combination set forth in claim 2, each guide being provided with at least one flange upstanding from its strip-engaging surface and adapted to engage one of the edges of the strip for restraining lateral shifting of the strip during its travel.

4. In an apparatus of the character described, the combination set forth in claim 2, each guide being provided with a pair of opposed shoulders upstanding from its strip-engaging surface and adapted to engage the edges of the strip for restraining lateral shifting of the strip during its travel.

5. In an apparatus of the character described, the combination set forth in claim 2, the outlet ends of said guides being tangential to the remaining portions of the paths of travel of the respective strips toward said arbor.

6. In an apparatus of the character described, the combination set forth in claim 2, each guide being provided with a pair of opposed shoulders upstanding from its strip-engaging surface and adapted to engage the edges of the strip for restraining lateral shifting of the strip during its travel, said guides being so positioned with respect to one another that the strips emanating therefrom have their edges accurately parallel and in predetermined lateral relationships.

7. In an apparatus of the character described, the combination set forth in claim 2, each guide being provided with a pair of opposed shoulders upstanding from its strip-engaging surface and adapted to engage the edges of the strip for restraining lateral shifting of the strip during its travel, said guides being so positioned with respect to one another that the strips emanating therefrom have their edges accurately parallel to the direction of travel, said shoulders being so arranged that the edges of certain strips are in predetermined laterally-offset relationships to the edges of the other strips.

8. In an apparatus of the character described, the combination set forth in claim 2, each arcuate path having a reverse curvature relative to the curvature of the strip on the corresponding supply reel.

9. In an apparatus of the character described, the combination set forth in claim 2, each arcuate path having a reverse curvature relative to the curvature of the strip on the corresponding supply reel, the inlet end of each guide surface being so positioned with respect to said supply reel that the strip encounters the guide surface tangentially.

ERNST A. NORDBERG.

REFERENCES CITED

The following references are of record in the file of this patent:

UNITED STATES PATENTS

| Number | Name | Date |
|---|---|---|
| 1,474,319 | Crosby | Nov. 13, 1923 |
| 1,641,389 | Kroeger et al. | Sept. 6, 1927 |
| 1,645,882 | Stuber | Oct. 18, 1927 |
| 1,850,102 | Grout | Mar. 22, 1932 |